United States Patent [19]

Parsons

[11] Patent Number: 4,704,896
[45] Date of Patent: Nov. 10, 1987

[54] AIR GAGE ASSEMBLY

[75] Inventor: Norman H. Parsons, Bloomfield Hills, Mich.

[73] Assignee: D-Tec, Inc., Fraser, Mich.

[21] Appl. No.: 812,065

[22] Filed: Dec. 23, 1985

[51] Int. Cl.$^4$ ............................................. G01B 13/00
[52] U.S. Cl. ...................................... 73/37.9; 29/714; 33/DIG. 2; 73/151
[58] Field of Search ...................... 29/714; 33/DIG. 2; 73/151, 37, 37.5, 37.9

[56] References Cited

U.S. PATENT DOCUMENTS

| 2,479,606 | 8/1949 | Douglass | 73/37.5 |
| 2,618,964 | 11/1952 | Byrkett | 73/37 |
| 2,618,965 | 11/1952 | Gray | 73/37 |
| 2,669,864 | 2/1954 | Brewster | 73/37.5 |
| 3,438,244 | 4/1969 | Plumpe, Jr. | 73/37.9 |
| 3,792,605 | 2/1974 | Rabenau | 73/37.9 |
| 3,793,875 | 2/1974 | Jurkiewicz | 73/37.5 |
| 4,034,478 | 7/1977 | Yager | 33/DIG. 2 |
| 4,437,335 | 3/1984 | Gates | 73/37.9 |

Primary Examiner—Timothy V. Eley
Attorney, Agent, or Firm—Krass & Young

[57] ABSTRACT

An air gage assembly for testing for the presence of threads in holes in a workpiece or for the presence of the holes per se. The assembly includes a hollow housing open at one end and closed at the other end; an elongated probe assembly; means pivotally mounting the probe assembly in the housing in a location intermediate the ends of the probe assembly with one free end of the probe assembly positioned within the hollow of the housing and the other free end positioned outside of the housing; means for supplying air to the hollow of the housing; and means for passing the air centrally through the probe assembly for discharge through the other free end of the probe assembly and against the threaded or unthreaded wall of the hole to be tested. A thrust piston engages the free end of the probe assembly within the housing and a Hall effect transducer positioned in the housing adjacent the free end of the probe assembly detects both axial and wobble movement of the probe assembly indicative respectively of the lack of the hole in the workpiece or a broken or bent probe tool. A control unit associated with the probe assembly receives linear output signals from the probe assembly and analyzes these signals to provide information with respect to the presence or absence of a thread in the bore; the presence of a bore; a broken or bent probe tool; or failure of the overall system.

16 Claims, 7 Drawing Figures

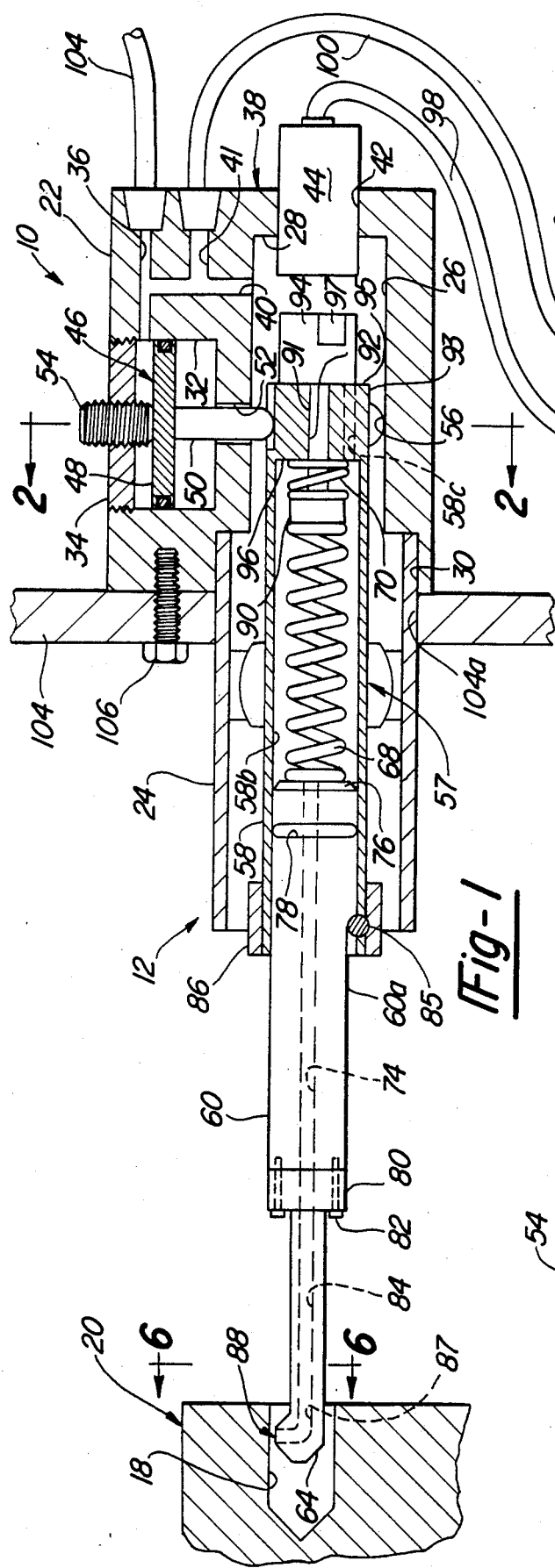
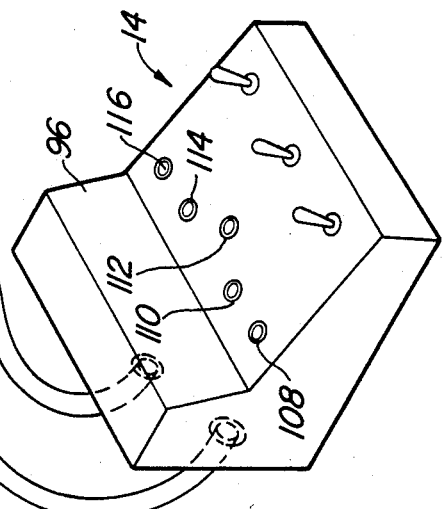
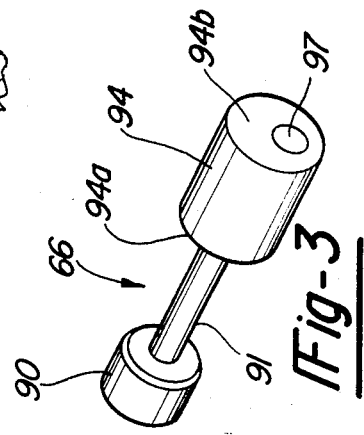
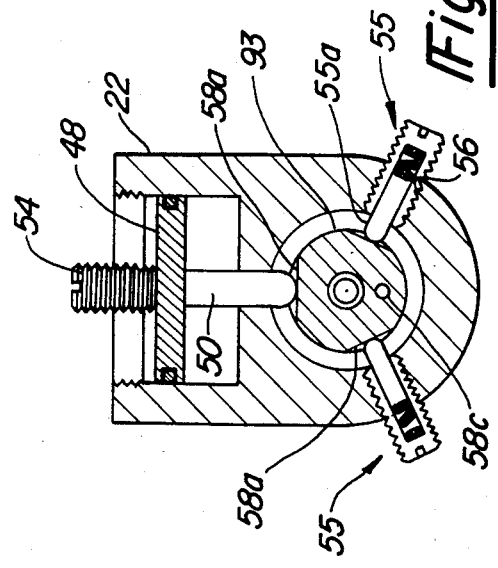
Fig-1
Fig-3
Fig-2

AIR GAGE ASSEMBLY

FIELD OF THE INVENTION

This invention relates to air gage assemblies and more particularly to an air gage assembly especially suited for use with tapped holes.

BACKGROUND OF THE INVENTION

In the manufacturing of various devices or parts, such as an engine block or a head for the engine block, the part is predrilled and tapped to provide threaded holes for bolts for securing the part to another part. For example, threaded holes are drilled and tapped in the engine block so that the head can be secured thereto. After the predrilling and tapping operations, it is desirable to check each of the tapped holes to determine if the hole exists at all, whether the hole has been drilled to the proper depth, and whether or not the hole has been properly tapped.

Various devices have been proposed to perform these operations. These devices typically include a probe having a fluid outlet and means for sensing the pressure of air passed through the fluid outlet. The probe is inserted into the hole and the sensor detects increased back pressure within the probe caused by the absence of threads in the hole, or the sensor detects a predetermined collapsing movement of the probe indicative of the lack of a hole or the presence of a hole of insufficient depth.

None of these prior art devices have achieved widespread commercial acceptance since they have been incapable of adjustment or calibration to suit the particulars of various work environments or, if calibration is provided, the calibration has proven to be very awkward and commercially impractical. Further, the various signals provided by the prior art devices have proven to be of limited usability in a commercial environment.

SUMMARY OF THE INVENTION

The present invention provides an air gage assembly that is capable of providing commercially practical signals with respect to the presence or absence of a thread in a hole and with respect to the presence or absence of the hole itself, and which is capable of ready adjustment or calibration to suit the particulars of a wide variety of work environments.

The air gage assembly of the invention includes a hollow housing open at one end and closed at the other end; an elongated probe assembly; means pivotally mounting the probe assembly to the housing at a location intermediate the ends of the probe assembly with one free end of the probe assembly positioned within the hollow of the housing and the other free end positioned outside of the housing; means for supplying air to the hollow of the housing; and means for passing the air centrally through the probe assembly for discharge through the other free end of the probe assembly. This basic arrangement simplifies the movement of the probe assembly between inactive and active positions; facilitates the ready and multi-axial adjustment of the probe assembly to suit varying work environments; and generally simplifies maintenance and adjustment of the probe assembly.

According to a further feature of the invention, the air gage assembly includes ower means on the housing engaging the free end of the probe assembly within the hollow of the housing and operative when actuated to pivot the probe about its pivot axis to thereby selectively position the other free end of the probe assembly relative to the hole to be inspected. This arrangement provides a positive and simple movement of the probe assembly to its active position and concentrates the bulk of the air gage assembly at the end thereof remote from the probe tip so as to minimize the bulk of the air gage assembly in the viciity of the workpiece to allow a plurality of air gage assemblies to be mounted to a common mounting plate with the adjustment and maintenance areas of the assemblies positioned in the protected environment behind the mounting plate.

According to a further feature of the invention, coacting means are provided on the housing and on the free end of the probe assembly within the hollow of the housing for sensing angular movement of the free end of the probe assembly.

Acccording to a further feature of the invention, the air gage assembly includes a probe housing and a member positioned adjacent the free end of the probe assembly within the hollow of the housing and movable axially relative to the probe housing, and the coacting sensing means further function to sense axial movement of this member relative to the probe housing.

According to a further feature of the invention, adjustment means are provided on the housing which engage the free end of the probe assembly positioned within the hollow of the housing and operate to selectively angularly position this free end and thereby selectively position the tip of the probe assembly relative to the hole to be inspected. This arrangement allows the adjustment of the probe to suit the particular work environment to be accomplished without movement of the housing and further allows the adjustment to be accomplished in the protected environment behind the mounting plate for the air gage assembly.

According to a further feature of the invention, the pivot means for the probe assembly allows multi-axis pivotal movement of the probe assembly relative to the housing and the adjustment means provides multi-axis angular movement of the probe assembly to thereby provide multi-axis positioning of the probe tip relative to the hole to be inspected.

According to a further feature of the invention, resilient means are provided on the housing for engagement with the free end of the probe assembly positioned within the hollow of the housing and the power means comprises a piston and cylinder assembly including a piston, a piston rod engagable with the probe assembly at a location thereon spaced circumferentially from the point of engagement of the probe assembly by the resilient means, and an adjustable stop member engageable with the piston and operative when adjusted to move the piston rod into engagement with the free end of the probe assembly to pivot the probe assembly against the resistance of the resilient means. This arrangement allows adjustment of the probe assembly to suit a particular work application in the protected environment behind the mounting plate and ensures that the probe assembly will return positively to its neutral or centered position upon the completion of each actuating stroke of the air gage assembly.

According to a further feature of the invention, the resilient means comprises a pair of spring-loaded plungers positioned in the housing and projecting into the hollow of the housing for resilient engagement with circumferentially spaced locations on the free end of the probe assembly. In a disclosed embodiment of the invention, the piston rod and the plungers engage the free end of the probe assembly at three substantially equally angularly spaced locations around the probe assembly. This arrangement provides a simple and effective means of adjusting the probe assembly for any particular work application and provides a positive and effective means of returning the probe assembly to its neutral position after each actuating stroke.

According to a further feature of the invention, the various signals generated by the air gage assembly are continuous and linear, rather than yes/no as in the prior art devices, so as to provide more detailed and more useful information to the operator of the air gage assembly with respect to the presense of a suitable hole, the presence of threads, or malfunctions of the air gage assembly.

BRIEF DESCRIPTION OF THE DRAWINGS

FIG. 1 is a cross-sectional, somewhat schematic view of an air gage assembly according to the invention;

FIG. 2 is a cross-sectional view taken on line 2—2 of FIG. 1;

FIG. 3 is a perspective view of a part of the air gage assembly of FIG. 1;

DETAILED DESCRIPTION OF THE PREFERRED EMBODIMENT

Figure 4:
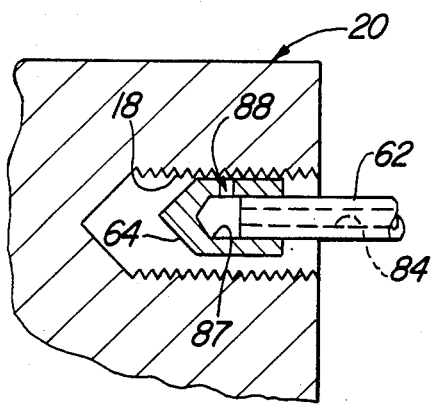
FIG. 4 is a fragmentary view on an enlarged scale of a portion of the air gage assembly and showing a modified probe tip construction.

The invention air gage assembly, broadly considered, includes a housing assembly 10, a probe assembly 12 and a control unit 14. The invention air gage assembly is intended for use in inspecting a bore 18 in a workpiece 20.

Housing assembly 10 includes a main housing 22 and an auxiliary housing or cartridge 24.

Main housing 22 includes a central axial bore 26 terminating in a blind end 28 and a counter bore 30 at the open end of bore 26. Main housing 22 further includes a cylindrical bore 32 extending at right angles to bore 26 and closed by a screw cap 34; an axial supply bore 36 extending between bore 32 and the rear end 38 of the housing; a transverse bore 40 extending between bore 36 and bore 26; and an axial readout bore 41 extending between bore 40 and the rear end 38 of the housing. The rear end 38 of housing 22 is further provided with an axial bore 42 for receipt of a magnetic field sensor 44. Magnetic field sensor 44 is preferably a Hall Effect sensor of the type capable of producing a continuous linear output. Such a continuous linear output Hall Effect sensor is available, for example, from Microswitch Division of Honeywell Corporation as Part No. 103SR3F-5. A piston and cylinder assembly 46 is positioned in bore 32 and includes a piston 48; a piston rod 50 extending through a transverse bore 52 in housing 22 for engagement with the rear end of probe assembly 12; and an adjustable stop screw 54 threadably received in cap 34 and engaging piston 46. As best seen in FIG. 2, a pair of spring plunger assemblies 55 are threadably received in threaded radial bores 56 in housing 22 in axial alignment with bore 52. Piston rod 50 and plungers 55a of plunger assemblies 55 engage the rear end of probe assembly 12 at equal angularly spaced locations about the periphery of the probe assembly.

Auxiliary housing or cartridge 24 is tubular and is fixedly received at its rear end in counter bore 30 of main housing 10. A spherical bearing assembly 57 is positioned within cartridge 24 for receipt of probe assembly 12.

Probe assembly 12 includes a probe housing 58, a probe piston 60, a probe tool 62, a probe tip 64, a spool assembly 66, a spring 68, and a further spring 70.

Probe housing 58 is tubular and is slidably received within spherical bearing 57 and includes circumferentially spaced flats 58a at its rearward end. Flats 58a coact with piston rod 50 and plungers 55a of plunger assemblies 55 to preclude inadvertent axial withdrawal of the probe housing 58 from housing assembly 10.

Probe piston 60 is slideably received within the central bore 58b of probe housing 58 and includes a central axial bore 74 and a sealing ring 76 received in a circumferential external groove 78 and sealingly but slidable engaging bore 58b. Probe tool 62 includes a flange portion 80 mounted to the front end of probe piston 60 by bolts 82 and a central axial bore 84 in axial alignment with bore 74 of probe piston 60. A transverse pin 85 mounted in a collar 86 secured to the forward end of probe housing 58 engages a flat 60a on probe piston 60 to limit outward axial movement of piston 60 relative to probe housing 58.

Probe tip 64 may be formed integrally at the free end of probe tool 62 as seen in FIG. 1 or may comprise a separate member press fitted on the free end of probe tool 62 as seen in FIG. 4. In either case, probe tip 64 defines a central passage 87 in communication with central bore 84 of probe tool 62 and a transverse fluid outlet 88 positioned generally parallel to piston rod 50 and on the same side of the probe assembly as piston rod 50.

Spool assembly 66 includes a spool 90 slideably positioned within bore 58a of probe housing 58, a rod 91 secured centrally to spool 90 and extending axially through an axial bore 92 in the solid rear end portion 93 of probe housing 58, and a cylindrical magnet holder 94 secured to the rear end of rod 91 and normally arranged with its front face 94a positioned against the rear face 95 of probe housing 58.

Spring 68 is a relatively stiff spring positioned in bore 58b between the rear end of probe piston 60 and the front end of spool 90 and spring 70 is a relatively weak spring positioned in bore 58b between the rear end of spool 90 and the blind end face 96 of bore 58b.

A cylindrical permanent magnet 97 is mounted in a cylindrical bore in the rear end of magnet holder 94 with the rear end of the magnet generally flush with the rear face 94b of the magnet holder. Magnet 97 is positioned assymetrically with respect to the central axis of magnet holder 94 and with respect to the central axis of the probe assembly. Magnetic field sensor 44 is positioned on the central axis of the probe assembly so that magnet 97 is also assymetrical with respect to magnetic field sensor 44. An axial feed bore 58c extends through the solid rear end portion 93 of probe housing 58 to provide communication between bore 26 and bore 58b and thereby bores 74, 84, 87 and 88.

Figure 5:
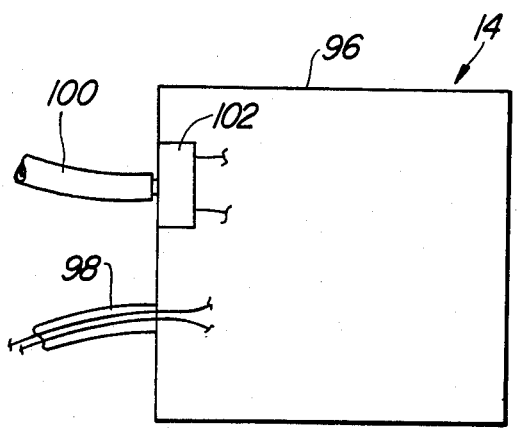
FIG. 5 is a fragmentary view of a control unit used in the invention air gage assembly.

Control unit 14 includes a housing 96 connected to magnetic field sensor 44 by an electrical cable 98 and connected to readout bore 41 of main housing 22 by an air hose 100. As seen in FIG. 5, air hose 100 is coupled to a linear pressure transducer 102 positioned in the rear face of housing 96.

OPERATION

Figure 6:
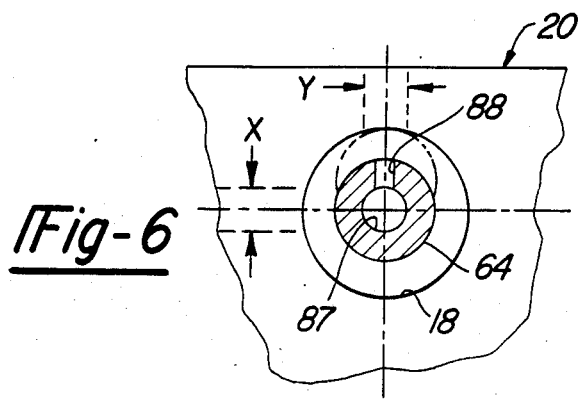
FIG. 6 is a fragmentary view showing the calibrating movement of the probe tip of the invention air gage assembly.

The air gage assembly is secured to a mounting plate 104 by bolts 106 passing through the plate for engagement with main housing 22 and with cartridge 24 passing through an aperture 104a in the mounting plate. Before actual testing, it is necessary to calibrate the air gage assembly to the particular workpiece 20 being tested. Calibration is achieved by moving the mounting plate 104 forwardly until the probe tip 64 is about to enter the bore 18 of the test part 20. Spring plunger assemblies 55 and set screw 54 are now selectively threadably adjusted to pivot the probe assembly about spherical bearing 57 to provide movement in both X and Y directions as seen in FIG. 6 so as to center the probe tip with respect to the hole 18. Specifically, the X axis adjustment of the probe tip is accomplished by adjustment of set screw 54 and the Y axis adjustment of the probe tip is accomplished by selective threaded adjustment of spring plunger assemblies 55. In the final adjusted or calibrated position of the plunger assemblies 55 and set screw 54, the plungers 55a and the tip of piston rod 50 engage circumferentially spaced locations on probe housing 58 and the tip of set screw 54 firmly engages the rear face of piston 48.

After the probe tip has been aligned on the X and Y axes with respect to the hole 18, the mounting plate 104 is suitably advanced to move the probe tip 64 into hole 18 to the position seen in FIGS. 1 and 4. Pressurized air from a suitable source is now introduced through a hole 104 into axial bore 36 in main housing 22. The pressurized air from bore 36 enters cylindrical bore 32 behind piston 48 and causes the piston to advance away from set screw 54.

As the piston advances, piston rod 50 pushes on the probe assembly and pivots the probe assembly to the thread sensing position seen in FIG. 4 and seen in phantom lines in FIG. 6. Simultaneously, air entering axial bore 36 passes through transverse bore 40, through bore 26, through bore 58c, through bore 58b, through bore 74, through bore 84, through bore 87 and through fluid outlet 88. If the pressurized air exiting through fluid outlet 88 encounters a thread in hole 18 there is little restriction of the air escaping from the fluid outlet since the air passes readily through and around the helical groove defined by the thread. Accordingly, the pressure sensed in bore 41 and the back pressure created in the probe assembly and transmitted by hose 100 to pressure transducer 102 is relatively low and the linear electrical voltage generated by linear pressure transducer 102 is a relatively low value. If, however, there is no thread in hole 18, the probe tip is thrust up against the smooth bore of the hole to provide a high restriction for the air attempting to escape fluid outlet 88 with the result that the back pressure generated in the probe assembly and sensed at linear pressure transducer 102 is relatively high and the linear voltage generated by linear pressure transducer 102 is proportionately high. Following the thread-sensing operation, the supply of pressurized air to the unit is terminated and the probe assembly returns to its central or neutral position under the positive action of spring plunger assemblies 55 with piston 48 seating against set screw 54 to precisely define and delimit the neutral, calibrated position of the probe assembly.

If, upon advancement of mounting plate 104, the probe tip 64 strikes the surface of workpiece 20 since no hole 18 has been provided in the workpiece, probe piston 60 is driven telescopically into probe housing 58 to cause spool 90 to move against the resistance of relatively weak spring 70 and thereby move spool holder 94 axially away from the end face 93 of probe housing 58 and toward Hall Effect sensor 44. This in turn causes axial movement of permanent magnet 97 toward and relative to Hall Effect sensor 44. Hall Effect sensor 44 is normally transmitting a constant voltage to control unit 14. However, as magnet 97 is moved axially toward Hall Effect sensor 44, the voltage transmitted by the sensor 44 changes in a continuous and linear manner as the magnet moves linearly toward the sensor and this continuously and linearly changing voltage output of sensor 44 is transmitted by cable 98 to control unit 14 for suitable analysis.

The described arrangement is also capable of sensing excess wobble of the probe assembly occurring, for example, in response to a broken probe tool or a bent probe tool. Specifically, as the piston and cylinder assembly 46 is actuated to pivot the probe assembly to its sensing position, magnet 97 is moved angularly relative to Hall effect sensor 44 to generate a known voltage change at the control unit 14. If the probe assembly continues beyond its sensing position as a result of a bent or broken probe tool 62, the excess angular movement of magnet 97 relative to Hall Effect sensor 44 will result in sensor 44 generating a voltage value that is indicative of a fault condition and this fault condition value is transmitted by cable 98 to control unit 14 for suitable analysis.

Figure 7:
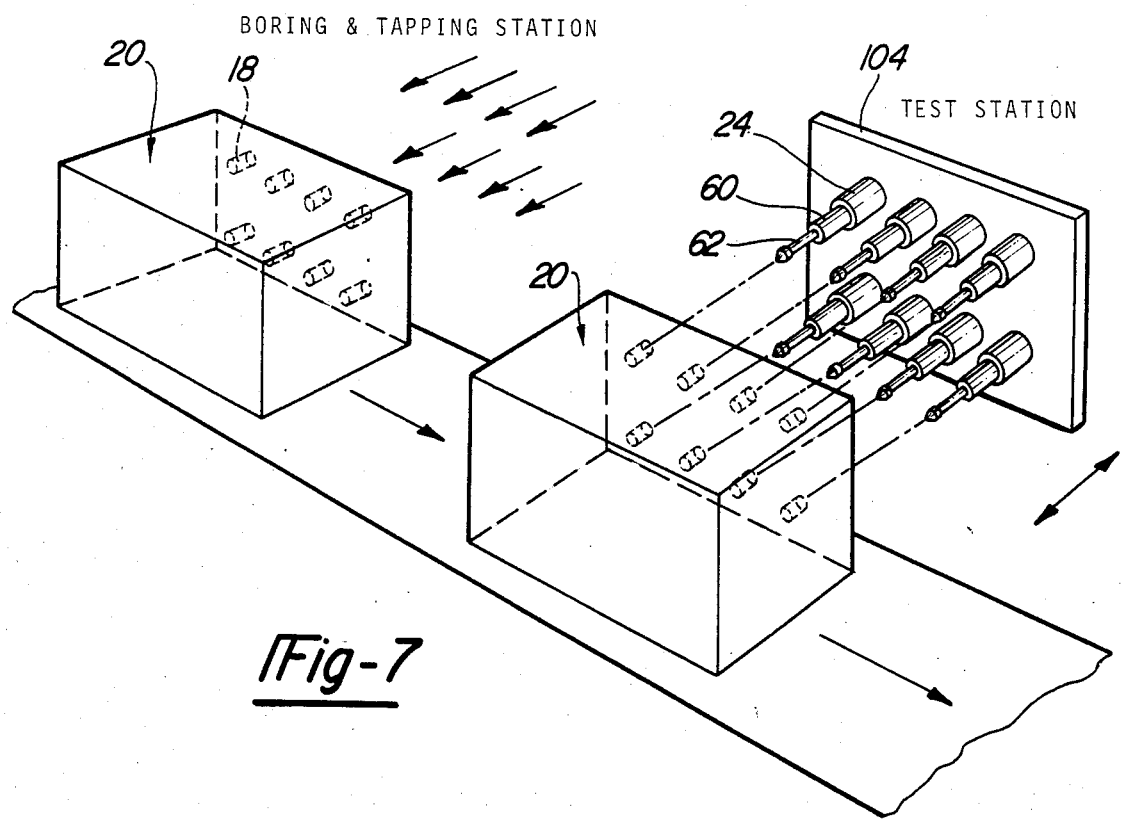
FIG. 7 is a schematic view showing the progress of a workpiece from a boring and tapping station to a testing station.

In actual practice, the invention air gage assembly will typically be used in a situation where a plurality of air gage assemblies are mounted in a predetermined geometric pattern on a mounting plate 104 so that, as seen in FIG. 7, a plurality of probe assemblies may be moved toward and away from the workpiece 18 in unison.

Specifically, in the case of a workpiece comprising an engine block, the engine block may be bored and tapped in known manner and thereafter moved by suitable conveying means to a test station where the workpiece is tested to detect the presence or absence of threads in the holes 18 and to detect the presence or absence of holes per se. A plurality of air gage assemblies corresponding in number and relative geometric placement to the number and relative geometric placement of the holes 18 in the workpiece are provided in mounting plate 104 and the air gage assemblies, following individual calibration with respect to holes 18, are moved forwardly in unison to check for the presence or absence of holes 18 per se and to respectively enter the holes 18 to check for the presence or absence of threads whereafter the air gage assemblies are withdrawn in unison by suitable withdrawal of mounting plate 104 to await the arrival of a further engine block 20.

With respect to each individual air gage assembly, the absence of a hole 18, or the presence of a hole 18 of insufficient depth, will be indicated by the generation of a predetermined linear voltage by Hall effect sensor 44 resulting from the axial movement of magnet 97 toward Hall Effect sensor 44; the presence of a broken or bent probe tool will be indicated by the generation of a predetermined linear voltage by Hall Effect sensor 44 in response to excessive angular movement of magnet 96 relative to the sensor; and the presence or absence of a thread in the respective hole 18 will be indicated by the absolute value of the linear voltage generated by pressure transducer 102 in response to the back pressure generated in the air gage assembly.

The manner in which the generated voltages are read out at control unit 14 will vary depending upon the particular application. In the disclosed embodiment, and as best seen in FIG. 1, a plurality of indicating lights 108, 110, 112, 114 and 116 are provided on housing 96. The circuitry within control unit 14 is operative to energize light 108 in the event of an excessively high voltage signal from sensor 44 indicative of axial movement of magnet 97 toward the sensor as a result of the absence of a hole in the workpiece; to energize light 110 in the event of the generation of a predetermined low voltage by sensor 44 in response to excessive angular movement of magnet 97 relative to the sensor occurring in response to a broken or bent probe tool; to energize light 114 in response to an excessively high voltage generated by pressure transducer 102 in response to excessive back pressure in the probe assembly resulting from the lack of a thread in hole 18; to energize indicator light 116 in the event of an excessively low voltage output from pressure transducer 102 indicative of a total or near completed loss of air pressure resulting from a breakdown at the supply source or from a broken or disconnected air supply line; and to energize indicator light 112 in the event that (1) the back pressure generated within the air probe assembly is within the window established by the high and low values respectively signalled by lights 114 and 116 and indicative of the presence of a thread in hole 18, and (2) the voltage signal from Hall effect sensor 44 is within the window established by the high and lower values respectively signalled by lights 108 and 110 and indicative of the presence of a hole of proper depth and the presence of an intact probe tool. The particular comparator circuits employed to convert the linear electrical voltage signals generated by pressure transducer 102 and Hall effect sensor 44 will vary depending upon the particular application but in any event will comprises existing and known solid-state componentry involving some manner of voltage comparator. Although the invention air gage assembly is disclosed as requiring a separate control unit for each probe assembly, it will be understood that, utilizing known solid-state componentry and technology, a single control unit may be arranged to process information from more than one probe assembly.

The invention air gage assembly will be seen to provide many important advantages are compared to the prior art air gage assemblies.

Specifically, the trunion mounting of the probe assembly at a location intermediate its ends provides a simple and effective overall construction for the air gage assembly.

The intermediate trunion mount allows placement of the piston and cylinder into the rear portion of the housing so that the housing portions adjacent the forward end of the probe assembly may be of minimal diameter or thickness. This in turn allows the mounting plate 104 to be positioned forwardly of the large diameter portion of the housing rather than, as in prior art designs, at the extreme rearward end of the housing, with the result that all of the critical areas of the probe assembly with respect to adjustment, operation and maintenance are placed behind the mounting plate 104. This is important in the commercial application of the invention since the area in front of the mounting plate 104 in a typical installation is crowded and difficult to access and is often polluted by contaminants such as oil from the boring and tapping station, whereas the area behind the plate 104 is protected and readily accessible. An operator positioned behind mounting plate 104 may thus perform almost all of the essential calibration, maintenance and operating functions in the protected environment behind the mounting plate. Specifically, the operator situated in the protected environment behind the mounting plate may readily access and maintain the piston and cylinder assembly; may readily access and adjust the spring plunger assemblies 55 and set screw 54 to provide X and X axis calibration of the probe tip relative to the hole; may readily mount, remove, or adjust the Hall effect switch; and may conveniently monitor all of the test results since all of the readouts from the probe assembly are taken at the rear of the probe assembly behind the mounting plate.

The intermediate trunion mounting of the probe assembly also frees up the rear end of the probe assembly for readout purposes and specifically allows the use of a single Hall effect sensor to detect both axial collapsing movement of the probe assembly, indicative of no hole, and excess wobble movement of the probe assembly indicative of a broken or bent tool. The intermediate trunion mount of the probe assembly also places the sensitive components of the probe assembly in the protected region behind the mounting plate where they are protected from contamination by oil or other contaminants present in the area in front of the mounting plate.

The magnet and Hall Effect arrangement of the invention probe assembly also provides a longer product life than the leaf or spring-type microswitches employed in the prior art devices and further allows the provision of a low voltage and hermetically sealed construction which is virtually free of hazard from electrical shock.

The invention probe assembly also provides linear readout values as compared to the yes/no signals provided by the prior art devices. Specifically, the described linear Hall effect sensor 44 provides a linear readout in response to both angular and axial movement of the magnet relative to the sensor and this linear readout can be suitably analyzed in known manner to provide an accurate and finite indication of the actual conditions being encountered by the probe assembly. Similarly, the linear pressure transducer provided in the control unit provides a linear readout with respect to the back pressure developed in the probe assembly and this linear readout can be suitably analyzed in known manner to provide an accurate and finite signature analysis of the back pressure conditions being generated within the probe assembly.

The described trunion mount construction also allows for ready removal of the probe assembly from the housing assembly. Specifically, the probe assembly may be removed from the housing assembly simply by backing off on the spring plunger assemblies 55 and axially withdrawing the probe housing 58 from the spherical bearing 57. Reinsertion of the probe assembly into the housing assembly is performed in a similar simple manner.

The described construction also allows the entire air gage assembly to be removed from the mounting plate 104 simply by loosening bolts 106 to allow the cartridge 14 to be withdrawn through bore 104a and allow the entire air gage assembly to be removed from the plate by an operator positioned in the protected environment behind the mounting plate.

The described construction also allows the probes to be placed in relatively close side-by-side disposition since the front portions of the air gage assembly, by virtue of the intermediate trunion mount, are relatively narrow in profile.

The described construction also allows the air gage assembly to distinguish between a positive condition in which a low back pressure is generated because of the presence of a thread and a similar condition in which a low back pressure is caused by failure of the air supply or other failure in the system. Specifically, the linear signal provided by the invention air gage assembly allows the unit to distinguish between a relatively low back pressure indicative of the presence of a thread and the lack of a back pressure indicative of failure of the system. In general, the fact that the invention air gage assembly generates linear signals enables the various signals to be analyzed relative to a known window of acceptable values thereby allowing more accurate and finite adjustment with respect to the various signals and simplifying the detection of minor malfunctions in the system.

The described adjustment arrangement, including spring plungers assemblies 55 and set screw 54, in addition to providing ready and convenient adjustment of the probe tool with respect to both the X and Y axes, provides a positive equalizing force which automatically and positively centers the probe assembly as the piston 50 rod is withdrawn following each sensing operation. Further, since the invention air gage assembly generates linear readout signals which are accessible at a remote location outside of the primary housing of the assembly, the assembly may be calibrated at a location remote from the primary housing and without entering, or violating the integrity of, the primary housing.

Whereas a preferred embodiment of the invention has been illustrated and defined in detail, it will be apparent that various changes may be made in the disclosed embodiment without departing from the scope or spirit of the invention.

I claim:

1. An air gage assembly comprising:
   A. a hollow housing open at one end and closed at the other end;
   B. an elongated probe assembly;
   C. means pivotally mounting said probe assembly to said housing at a location intermediate the ends of the probe assembly with one free end of the probe assembly positioned within the hollow of said housing and the other free positioned outside of said housing;
   D. means for supplying air to said hollow of said housing; and
   E. means for passing such air centrally through said probe assembly for discharge through said other free end of said probe assembly.

2. A probe assembly according to claim 1 wherein:
   F. said assembly further includes power means on said housing engaging said one free end of said probe within said hollow and operative when actuated to pivot said probe assembly about its pivot axis to thereby selectively position said other free end of said probe assembly.

3. A probe assembly according to claim 1 wherein:
   F. said probe assembly further includes coacting means on said housing and on said one free end of said probe assembly for sensing angular mvoement of said one free end of said probe assembly.

4. A probe assembly according to claim 3 wherein:
   G. said probe assembly includes a probe housing and a member positioned adjacent said one free end of said probe assembly and movable axially relative to said probe housing; and
   H. said coacting means further functions to sense axial movement of said member relative to said probe housing.

5. A probe assembly according to claim 1 wherein:
   F. said probe assembly further includes adjustment means on said housing engaging said one free end of said probe assembly and operative to selectively angularly position said one free end within said hollow to thereby selectively position said other free end of said probe assembly.

6. An air gage assembly according to claim 5 wherein:
   G. said pivot means allows multi-axis pivotal movement of said probe assembly relative to said housing; and
   H. said adjustment means provides multi-axis angular movement of said probe assembly to thereby provide multi-axis positioning of said other free end of said probe assembly.

7. An air gage assembly according to claim 1 and further including:
   F. resilient means on said housing engaging said one free end of said probe assembly; and
   G. a piston and cylinder assembly on said housing including a piston, a piston rod engagable with said one free end of said probe assembly at a location thereon spaced circumferentially from the point of engagement of said resilient means, and an adjustable stop member engagable with said piston and operative when adjusted to move said piston rod into engagement with said one free end of said probe assembly to adjustably pivot said probe assembly against the resistance of said resilient means and thereby selectively position said other free end of said probe assembly.

8. An air gage assembly according to claim 7 wherein:
   H. said resilient means comprises a pair of spring-loaded plungers positioned in said housing and projecting into said hollow for resilient engagement with circumferentially spaced locations on said one free end of said probe assembly.

9. An air gage assembly according to claim 8 wherein:
   I. said piston rod and said plungers engage said one free end of said probe assembly at three substantially equally angularly spaced locations around said probe assembly.

10. An air gage assembly comprising:
    A. a hollow housing assembly having an open front end, a closed rear end, a relatively large diameter portion at its rear end, and a relatively small diameter portion at its front end;
    B. an elongated probe assembly extending into the open end of said housing to position one end thereof within the hollow of said housing adjacent the closed rear end of said housing and position its other end outside of said housing;

C. means for mounting said probe assembly for pivotal movement relative to said housing;
D. means for supplying air to said hollow;
E. means for passing such air centrally through said probe assembly for discharge through said other end thereof; and
F. a piston and cylinder assembly positioned in said relatively large diameter housing portion with its piston rod thrustingly engaging said probe assembly within said hollow.

11. The air gage assembly according to claim 10 wherein:
G. said housing assembly defines a shoulder between said large diameter and said small diameter housing portions;
H. said assembly further includes a mounting plate having a front face, a rear face, and a mounting hole therein; and
I. said housing assemby is secured to said mounting plate with said shoulder positioned against said rear face of said mounting plate and said small diameter portion passing through said mounting hole to position the front end of said small diameter housing portion in front of said plate.

12. An air gage assembly according to claim 11 wherein:
J. said mounting means comprises pivot means within said small diameter housing portion pivotally engaging said probe assembly at a location intermediate its ends; and
K. said piston rod engages the free end of said probe assembly within said large diameter housing portion.

13. An air gage assembly comprising:
A. a housing defining a hollow;
B. an elongated hollow probe assembly having one end positioned in said hollow of said housing and projecting out of the front of said housing to dispose its free tip end outside of said housing for testing coaction with a suitable surface;
C. means for supplying air to the hollow of said housing and through the hollow of said probe assembly to the tip end of said probe assembly for testing of the surface; and
D. means for generating a linear signal outside of said housing proportionate to the magnitude of the back pressure developed within said hollow in response to testing of the surface.

14. An air gage assembly according to claim 13 wherein:
E. said probe assembly is capable of axial movement relative to said housing; and
F. said air gage assembly further includes means for generating a further linear signal outside of said housing proportionate to the magnitude of such relative axial movement.

15. An air gage assembly according to claim 13 wherein:
E. said probe assembly is capable of pivotal movement relative to said housing; and
F. said air gage assembly further includes means for generating a linear signal outside of said housing proportionate to the magnitude of such relative pivotal movement.

16. An air gage assembly according to claim 13 wherein:
E. said probe assembly is capable of axial and pivotal movement relative to said housing;
F. said air gage assembly further includes means for generating a further linear signal outside of said housing proportionate to the magnitude of such relative axial movement; and
G. said air gage assembly further includes means for generating a still further linear signal outside of said housing proportionate to the magnitude of such relative pivotal movement.

* * * * *